No. 758,911. PATENTED MAY 3, 1904.
J. J. GRIFFIN.
CAN SOLDERING MACHINE.
APPLICATION FILED AUG. 12, 1903.
NO MODEL. 2 SHEETS—SHEET 2.
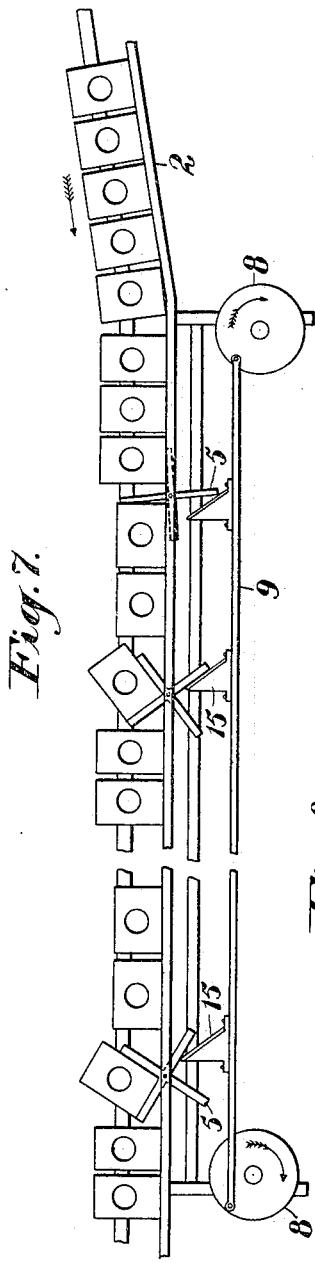
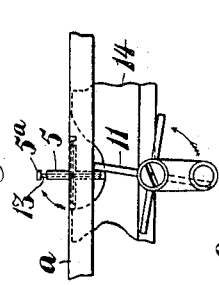
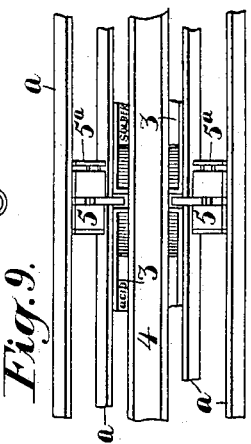
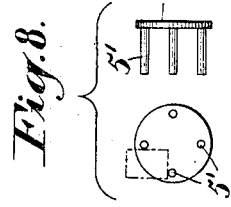
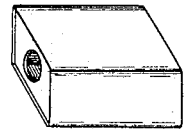
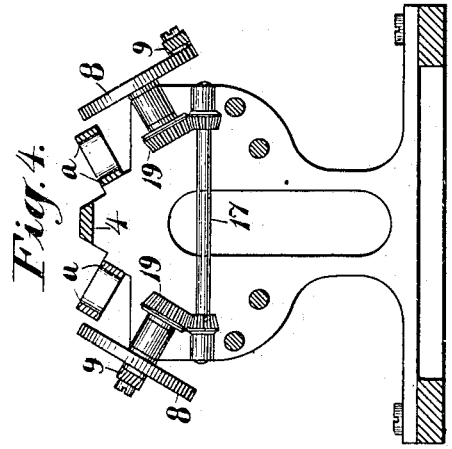
Witnesses:
F. C. Fliedner
J. A. Nurse
Inventor,
James J. Griffin
By Geo. H. Strong
Atty No. 758,911. Patented May 3, 1904.

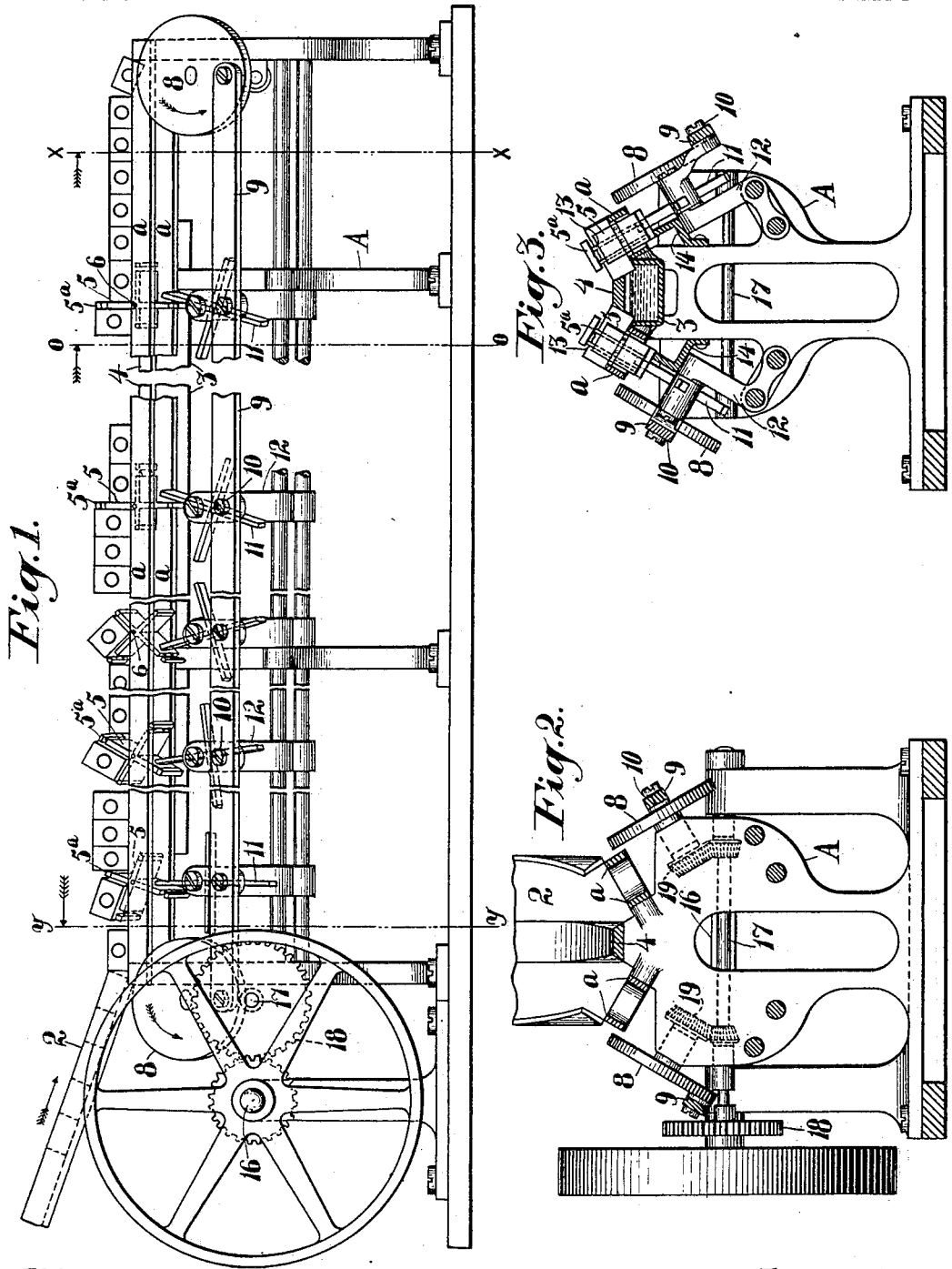

UNITED STATES PATENT OFFICE.

JAMES J. GRIFFIN, OF SAN FRANCISCO, CALIFORNIA, ASSIGNOR OF ONE-HALF TO A. W. LIVINGSTON, OF SAN FRANCISCO, CALIFORNIA.

CAN-SOLDERING MACHINE.

SPECIFICATION forming part of Letters Patent No. 758,911, dated May 3, 1904.

Application filed August 12, 1903. Serial No. 169,178. (No model.)

*To all whom it may concern:*

Be it known that I, JAMES J. GRIFFIN, a citizen of the United States, residing at the city and county of San Francisco, State of California, have invented new and useful Improvements in Can-Soldering Machines, of which the following is a specification.

My invention relates to improvements in apparatus for soldering cans, and particularly polygonal cans.

The object of my invention is to provide a machine wherein the cans will be advanced and turned to present the several angles of the cans to the successive acid and solder baths, and especially to provide a machine having a continuous movement in contradistinction to those of intermittent movement commonly in use, whereby the output of a machine may be greatly increased.

It consists of the parts and the construction and combination of parts as hereinafter more fully described, having reference to the accompanying drawings, in which—

Figure 1 is a side elevation of my apparatus. Fig. 2 is a section taken on line $y\ y$ of Fig. 1. Fig. 3 is a section taken on line $o\ o$ of Fig. 1. Fig. 4 is a section taken on line $x\ x$ of Fig. 1. Fig. 5 is a perspective of a can. Fig. 6 is a view looking at right angles to the plane of a turner and star-wheel. Fig. 7 is a modification of the apparatus. Fig. 8 is a modification of the turner. Fig. 9 is a plan of a section of the machine, showing contiguous ends of acid and solder troughs.

The device as here illustrated is designed more particularly for soldering rectangular cans, which have generally a greater width one way than the other, as shown in Fig. 5; but it is obvious that it can be equally well adapted to square or other polygonal cans or to round cans.

A is a frame made preferably of metal and of any suitable length and having the can-supporting surfaces $a\ a$ at each side and parallel with the axis of the machine. Upon each of these supports a line of cans is being continually fed from an inclined chute or other suitable means of supply, as indicated at 2.

The supports $a\ a$ incline downwardly toward each other and transversely of the machine, so that a can on either support will have one end elevated and the other adapted to dip slightly into the acid and solder troughs (represented at 3) and disposed below and intermediate the supports. The lower ends of the cans rest against and slide on a guide 4, which extends parallel with and intermediate the supports and above the baths 3.

It will be understood that an acid-bath will precede a solder-bath, so that when a can is first delivered into the machine the lower sides of the angle contiguous to the bath will be first dipped into acid and then as the can moves along the angle will be passed subsequently through the solder, which is kept in melted condition by any suitable heating means not necessary here to be shown.

In order to present the successive angles of a can to the acid and solder, it is necessary to turn the can from time to time during its progress through the machine. This is effected by means of the wheels or rotary turners 5, which may consist of a disk, as in Fig. 8, having the pins 5' projecting at right angles from its surface, or, as shown in Figs. 1 and 7, composed of the radial arms at right angles with each other. These turners are each mounted upon a shaft 6, disposed transverse to and approximately in the line of can travel and journaled in the frame A, so that any two opposed arms when in horizontal position will lie essentially parallel with or in, but not above, the plane of a support $a$. In practice it is desired that when a can is pushed in between any two adjacent arms it may be turned a quarter-revolution and deposited on the opposite side of the turner without being lifted above guide-bar 4 nor, in fact, having its lowermost edge leave the surface of the support $a$.

The can-supports may be composed of parallel bars, as here shown, or consist of continuous surfaces with openings at suitable intervals for the reception of the turners.

As a can passes through the machine it comes into the path of the arms of successive carriers or turners and is turned to present one angle after another to the acid and solder until the soldering operation is completed. Arriving at the rear end of the apparatus the cans soldered at one end are returned to the head of the machine by any suitable means, not necessary here to be shown, where they are directed again through the machine and on the side opposite to that previously traversed to solder the other end. In this second passage through the machine the cans are supported, advanced, and turned as in the first instance, the bar 4 serving for both lines of cans, as shown.

The advance of the cans between the turners is effected by the pushing action of the rotary arms upon the cans. For instance, a can is received upon an arm of a turner and turned and deposited upon the opposite side of the turner. As the latter continues to revolve, the arm which has just been supporting the can from behind pushes the can along the support $a$ out of its way, and in so doing makes room for the next succeeding can, while the can so pushed pushes the cans in front of it. As the motion of the turners is continuous, as will be seen, the cans progress uninterruptedly through the machine, each turner doing its work of turning and pushing.

In order to avoid jamming the cans, a uniformity of movement of the turners must be observed.

Any suitable means may be employed to operate the turners in unison. In Fig. 1 I have shown a preferred way whereby their movement is continuous.

8 represents two disks disposed one at either end of the machine and on each side thereof and connected by a rod or bar 9. This bar is conneced by wrist-pins 10 with an arm of each of the star-wheels 11, disposed below and relative to each of the turners 5 and adapted to have their arms interlock with the turner-arms in such fashion that each time an arm of a star-wheel engages an arm of its corresponding turner-wheel the latter will be turned a quarter-revolution. However, as the motion of the star-wheels is continuous the movement of the turners is practically continuous, and hence the advance of the cans through the machine is uninterrupted. The several star-wheels are suitably supported in brackets 12.

The spaces between the turners are preferably sufficient to receive at least three cans of the character shown in the drawings, and the space between any two adjacent turners will vary according to the combined length of the intermediate cans, which will depend on what side the cans are lying—that is, since rectangular cans are usually wider one way than the other, as per Fig. 5, three contiguous cans will occupy less space when lying on one side than on the other.

As the turners operate in unison, although they engage cans at slightly-different periods of time, as many cans are practically turned at each quarter-revolution of the turners in the series as there are turners in said series.

The engagement of the arms of the star-wheels with the turner-arms is so timed that the turner nearest the discharge end of the machine commences to lift a can a little sooner than the one next behind it does, and the penult a trifle earlier than the antepenult, and so on correspondingly toward the head of the machine, the object being to lift the can which is being turned out of the way of and to make room for the succeeding one when the can-column is pushed forward by the turner behind.

Since the turners are continually picking cans up on their longer side and depositing them on their shorter side, or vice versa, means should be provided to adjust the arms automatically to this condition, so that the end of an arm back of a can will always be flush with the outer edge of the can, thereby economizing space and avoiding injury to the cans by jamming. This adjustment is effected by having the arms of the turners extendible and contractible. In the present instance I have shown the arms made with a portion rigid with the shaft 6 and a movable part in the form of a cross-bar $5^a$ in the plane of each arm, the cross-bars of any two opposed arms being connected by rods 13, slidable through the rigid arm portions and hub, the two connected bars having a limited reciprocating movement corresponding to the difference in the widths of two sides of a can to be turned—that is, when one bar is shoved up against the end of its rigid complement the arm is of a length equal to the width of the narrower side of the can. When the bar is shoved out the arm is of the same length as the wider can side.

As a can has always two sides in contact with the turner-arms, the latter are continually changing their length relative to each other. Thus an arm which is beneath a can when the latter is received upon it must not protrude beyond the edge of that can or it would interfere with the can immediately behind when the arm lifted. The arm on the other side of the engaged can or the "front" arm, as it may be called, would be longer or shorter than the first-mentioned arm, according to the respective can sides. The front arm should not be shorter than the corresponding can side, since this arm is to engage the previously-turned can, which is now resting on the support $a$, and push it along. Should the front arm be shorter than its adjacent can side, the can would be jammed when it was turned against the can in advance.

The proper obtrusion of the can-arms into the path of the moving cans is effected by means of suitable curved guides 14, disposed eccentric to the turners and beneath the supports $a$.

In Fig. 7 is shown a modification of the apparatus in which the turners are revolved intermittently and only a quarter-revolution at each full turn of the crank-disks 8, whereas in the first case described the turners make one full revolution and turn four cans with every revolution of the disks 8. Hence the capacity of the continuous-movement machine is four times that of the intermittent-movement machine.

In the intermittent form of apparatus the connecting-rod 9 has upwardly-extending cam projections 15 in such position relative to the turning devices or carriers 5 that they contact with the lowermost of the carrier-arms on each revolution of the crank-disks 8 to turn all the carriers simultaneously a quarter-revolution.

The operating mechanism for the turners on the two sides of the machine is driven in unison from the power-shaft 16 through the medium of a shaft 17, parallel with shaft 16 and transverse to the machine and carrying a gear 18, which meshes a gear on shaft 16. Each of the inclined shafts of the adjacent crank-disks 8 is provided with a beveled gear 19, meshing corresponding gears on shaft 17.

It has been stated that at least three cans of the character shown would intervene between any two adjacent turners—that is, one can at least will rest on support $a$. This is for the reason that when a can which is rectangular in cross-section is lifted from a long side and deposited on the narrow side it would be rolled over on its long side again on striking support $a$ if it were not for the can already on there. The can on the support serves as a guide to steady the can being deposited. In fact, rectangular cans could not be handled in the machine if no provision were made for such an intervening can-guide. It would be impossible to handle cans having sides of different width were the arms of one turner adapted to interlock with those of another.

Having thus described my invention, what I claim, and desire to secure by Letters Patent, is—

1. In a continuously-operating rectangular-can-soldering machine, the combination of a horizontal, transversely-inclined can-support, a stop-bar parallel with said support against which the lower end of the can slides, successive acid and solder troughs relative to said support and means for continuously and simultaneously advancing and turning rectangular cans in their travel through the machine.

2. In a continuously-operating can-soldering machine, the combination of a horizontal transversely-inclined can-support, acid and solder troughs relative thereto, means for supporting the lower ends of the cans, and means including rotatable carriers in the path of can travel for continuously advancing and turning the cans.

3. The combination in a continuously-operating can-soldering machine, of stationary horizontal can-supporting means, acid and solder troughs relative thereto in which the angles of the cans may successively dip, radial-armed turners in the path of can travel, and means for operating said turners continuously.

4. The combination in a continuously-operating can-soldering machine, of stationary horizontal can-supporting means, acid and solder troughs, radial-armed turners journaled in the plane of the support by which the cans are turned and advanced, and means for operating said turners continuously.

5. In a can-soldering machine, the combination with can-supporting means and acid and solder baths, of rotary turners in the path of can travel, said turners having adjustable radial arms.

6. In a can-soldering machine the combination with can-supporting means and acid and solder baths, of rotary turners in the path of can travel, said turners having extendible and contractible radial arms and guide means in the path of said arms to effect such extension and contraction.

7. In a can-soldering machine, the combination with a support upon which the cans rest and are advanced, radial arms adapted to turn and advance the cans, a reciprocating bar, and connections between said bar and turner-arms whereby the latter are given continuous movement.

8. The combination in a rectangular-can-soldering machine of a transversely-inclined stationary support upon which the cans are received, acid and solder troughs so located with relation to the support that the lower angles of the cans will extend below the surface of the troughs, a stop against which the lower end of the can is arrested to limit said submergence, radial-armed wheels journaled in the plane of the can-support, revoluble crank-disks at each end of the apparatus with a connecting-rod and means operatable by said rod to contact with the lower turner-arms during the revolution of the disks whereby the cans lying upon said arms are turned a quarter-revolution, said turned cans acting to simultaneously advance those in front of them as the former are being forced forward by the arms onto the support.

9. The combination in a rectangular-can-soldering machine of a longitudinal horizontal transversely-inclined support upon which the cans are received, a stop-bar parallel therewith against which the lower ends of the cans are movable, successively-disposed acid and solder troughs located beneath the stop-bar and adapted to receive the lower angles of the cans, radial turner-arms journaled and revoluble in the plane of the support, said turners being separated to allow a plurality of cans to lie between them, crank-disks, a connecting-rod extending between said disks and means operated by said rod to engage the lower arms of the turners whereby the latter are revolved and the cans carried thereby turned a quarter-revolution, said cans while being advanced by the arms acting to simultaneously advance the cans which are in front of them.

10. The combination in a rectangular-can-soldering machine of a longitudinal horizontal transversely-inclined support upon which the cans are received, a stop-bar parallel therewith against which the lower ends of the cans are movable, successively-disposed acid and solder troughs located beneath the stop-bar and adapted to receive the lower angles of the cans as they pass, radially-disposed turner-arms journaled and revoluble in the plane of the support, and so located as to admit a plurality of cans between each set of turners, crank-disks located at each end of the apparatus and having a connecting-rod between them, means operatable by said rod to engage the lower arms of the turners during the revolution of the crank-disks, said turners having a movement relative to each other whereby the turners nearest the discharge end will be moved first and the others successively thereafter whereby the cans being turned are successively lifted to allow the advance of the succeeding cans and all cans are simultaneously advanced by the combined action of the turner-arms and the cans carried thereby.

11. The combination in a can-soldering machine of a plurality of longitudinal transversely-inclined supports with their lower edges adjacent, a stop-bar parallel with and intermediate of said supports against which the lower ends of the cans on both supports contact and are movable, acid and solder troughs located in line beneath the stop-bar, rotary turners journaled in the plane of each of the supports, longitudinally-reciprocating bars on each side of the machine, means for reciprocating said bars in unison, and means operated by said bars to engage the turners to turn the cans a quarter-revolution and cause the said cans to advance the preceding cans along said supports.

12. The combination with a horizontal, transversely-inclined can-support, of radial-armed turners journaled in the plane of the support and means for rotating said turners whereby they each engage a can at relatively different periods of time, said turners spaced to receive at least one can upon the intermediate section of said support.

In testimony whereof I have hereunto set my hand in presence of two subscribing witnesses.

JAMES J. GRIFFIN.

Witnesses:
HENRY P. TRICOU,
S. H. NOURSE.